United States Patent
Chen et al.

(10) Patent No.: US 10,611,910 B2
(45) Date of Patent: Apr. 7, 2020

(54) HALOGEN-FREE EPOXY RESIN COMPOSITION HAVING LOW DIELECTRIC LOSS

(71) Applicant: ITEQ CORPORATION, Hsinchu County (TW)

(72) Inventors: Kai-Yang Chen, Hsinchu County (TW); Chun-Hao Chang, Hsinchu County (TW); Yu-Chieh Hsu, Hsinchu County (TW)

(73) Assignee: ITEQ CORPORATION, Xinpu Township, Hsinchu County (TW)

( * ) Notice: Subject to any disclaimer, the term of this patent is extended or adjusted under 35 U.S.C. 154(b) by 0 days.

(21) Appl. No.: 15/807,163

(22) Filed: Nov. 8, 2017

(65) Prior Publication Data

US 2018/0223094 A1 Aug. 9, 2018

(30) Foreign Application Priority Data

Feb. 7, 2017 (TW) .............................. 106103998 A

(51) Int. Cl.
| | |
|---|---|
| *C08L 63/00* | (2006.01) |
| *C08G 59/40* | (2006.01) |
| *H01B 3/40* | (2006.01) |
| *H01B 3/30* | (2006.01) |
| *C08G 59/42* | (2006.01) |

(52) U.S. Cl.
CPC .......... *C08L 63/00* (2013.01); *C08G 59/4071* (2013.01); *C08G 59/4223* (2013.01); *H01B 3/303* (2013.01); *H01B 3/40* (2013.01); *C08L 2201/02* (2013.01); *C08L 2201/22* (2013.01); *C08L 2205/02* (2013.01); *C08L 2205/03* (2013.01)

(58) Field of Classification Search
CPC ....................................................... C08L 63/00
See application file for complete search history.

(56) References Cited

U.S. PATENT DOCUMENTS

| | | | | |
|---|---|---|---|---|
| 2014/0178696 A1* | 6/2014 | Yu | ........................ | C08L 63/00 428/418 |
| 2016/0122521 A1* | 5/2016 | Wang | ........................ | C08J 5/18 524/151 |
| 2016/0272808 A1* | 9/2016 | You | ....................... | C09D 163/00 |
| 2017/0283609 A1* | 10/2017 | Zeng | ..................... | H05K 1/0373 |
| 2017/0320994 A1* | 11/2017 | Arita | .......................... | C08J 5/24 |
| 2018/0346639 A1* | 12/2018 | Hirota | .................. | C08G 59/063 |

FOREIGN PATENT DOCUMENTS

| | | |
|---|---|---|
| CN | 101845199 A | 9/2010 |
| CN | 105482452 A | 4/2016 |
| CN | 105778430 A | 7/2016 |
| JP | 2002-012650 A | 1/2002 |
| JP | 2003-082063 A | 3/2003 |
| JP | 2003252958 A | 9/2003 |
| TW | 201331254 A | 8/2013 |
| TW | 201615673 A | 5/2016 |
| TW | 201635877 A | 10/2016 |

* cited by examiner

*Primary Examiner* — Megan McCulley
(74) *Attorney, Agent, or Firm* — Muncy, Geissler, Olds & Lowe, PC

(57) ABSTRACT

The present invention discloses a halogen-free epoxy resin composition having low dielectric loss, comprises: (A) 100 parts by weight of an epoxy resin; (B) 10-30 parts by weight of a DOPO modified curing agent; (C) 1-10 parts by weight of benzoxazine resin; (D) 60-90 parts by weight of an active ester compound; (E) 20-50 parts by weight of a flame retardant; and (F) 0.5-10 parts by weight of a curing accelerator. The halogen-free epoxy resin composition uses active ester as a curing agent of the epoxy resin to ensure that the hardening product has characteristics such as low dielectric constant (Dk), low dielectric loss (Df), high heat resistance, low water absorption, flame retardant and halogen-free. The halogen-free epoxy resin composition of the present invention is used for manufacturing semi-cured prepregs or resin-coated films, and is applied toward manufacturing metal clad laminates and printed circuit boards.

7 Claims, No Drawings

HALOGEN-FREE EPOXY RESIN COMPOSITION HAVING LOW DIELECTRIC LOSS

BACKGROUND OF THE INVENTION

Field of the Invention

The present invention relates to a halogen-free epoxy resin composition, in particular relates to a halogen-free epoxy resin composition having low dielectric loss characteristics.

Description of Prior Art

As electronic products data processing speed develops rapidly and offer functions diversified, the application frequency increases. 3-6 GHZ will become mainstream. In addition to the higher requirements of the heat resistance of laminate materials, the requirements of the dielectric constant and the dielectric loss value of the laminate materials will be lower and lower.

Existing conventional epoxy glass fiber cloth laminate (FR-4) has difficulty to meet the needs of high-frequency and high-speed development of electronic products, and at the same time substrate materials no longer support traditional mechanical means, and instead integrates with electronic components to form PCBs which becomes a critical means applied by end product manufacturer designers in order to increase product performance. Low signal transfer rate has been a concern when the dielectric constant (Dk) is high, and parts of the signal are converted into heat loss in the substrate materials when the dielectric loss value (Df) is high, reducing DK/Df has become the industry's desired features in substrate materials. Dicyandiamide has been used as a curing agent among the conventional raw materials to produce FR-4. Dicyandiamide has a tertiary amine structure, which can be highly reactive. However, the carbon-nitrogen bond of dicyandiamide is weak, and easily cracks under high temperature. Accordingly, the heat decomposition temperature of the curing agent is low and fails to meet the thermal requirements of lead-free processes. Therefore, along with a wide range of lead-free process implementation in recent years, novolac resins are used more often as curing agents for epoxy resins. The novolac resins have benzene ring structures with high thermal and high-density characteristics, although the cured epoxy structure has superior heat resistance, the dielectric properties of the cured product kept deteriorate.

In the prior arts, active ester curing agents having benzene, naphthalene or biphenyl structure are synthesized as the epoxy resin curing agent, such as IAAN, IABN, TriABN and TAAN. Compare to using conventional novolac compounds, the dielectric constants and dielectric loss values of the cured products obtained are significantly lowered.

Although the above mentioned prior arts using active esters as an epoxy resin cured agent can effectively improve moisture resistance, reduce water absorption, dielectric constant and the dielectric loss values of a cured product, the problem to keep the balance between heat resistance and dielectric properties of the cured product remain unresolved, wherein the balance ensures the cured product having a high glass transition temperature and a low dielectric loss value, and also keeps the dielectric properties in a relatively stable state as frequency changes, as well as keeps the water absorption low.

SUMMARY OF THE INVENTION

The objective of the present invention is to provide a halogen-free epoxy resin composition using active esters as curing agents of epoxy resin in order to ensure cured halogen-free products having circuit substrate properties of high glass transition temperatures, low dielectric loss values, high heat resistance, and high flame retardant property.

In order to achieve the above mentioned objective, the present invention discloses a halogen-free epoxy resin composition having low dielectric loss, comprises: (A) 100 parts by weight of an epoxy resin; (B) 10-30 parts by weight of a DOPO modified curing agent; (C) 1-10 parts by weight of benzoxazine resin; (D) 60-90 parts by weight of an active ester compound; (E) 20-50 parts by weight of a flame retardant; and (F) 0.5-10 parts by weight of a curing accelerator.

One aspect of the present invention is to provide the epoxy resin selected from one of the group consisting of bisphenol A type epoxy resin, bisphenol F type epoxy resin, bisphenol S type epoxy resin, phenol novolac type epoxy resin, cresol novolac type epoxy resin, bisphenol A novolac type epoxy resin, bisphenol F novolac type epoxy resin, diphenylenthylene type epoxy resin, epoxy resin having triazine skeleton, epoxy resin having fluorene skeleton, triphenylmethane type epoxy resin, biphenyl type epoxy resin, xylylene type epoxy resin, biphenyl aralkyl type epoxy resin, naphthalene type epoxy resin, dicyclopentadiene type epoxy resin, alicyclic epoxy resin, diglycidyl ether having polyfunctional phenols and fused ring aromatics, trifunctional and tetrafunctional epoxy resin with three or four epoxy group, and phosphorus-containing epoxy resin. Preferably, the epoxy resin is dicyclopentadiene type epoxy resin, which has functions such as effectively increases glass transition temperature Tg (~175°), reduces water absorption, and increases dimension stability etc.

The DOPO modified curing agent according to the present invention is selected from one of the group consisting of 9,10-dihydro-9-oxa-10-phosphaphenanthrene-10-oxide (DOPO) and its derivatives or resins. For example, the DOPO resin may be DOPO-HQ, DOPO-NQ, DOPO-PN, DOPO-BPN, and DOPO bonded epoxy resins, wherein DOPO-PN is DOPO-phenolic novolac, DOPO-BPN may be bisphenol novolac compounds such as DOPO-BPAN (DOPO-bisphenol A novolac), DOPO-BPFN (DOPO-bisphenol F novolac), DOPO-BPSN (DOPO-bisphenol S novolac) and the like. DOPO modified curing agents in the resin composition is used as a curing agent to the epoxy resins. The curing agents offer superior heat stability, low dielectric property and can also function as flame retardant.

The benzoxazine resin according to the present invention is selected from one of the group consisting of bisphenol F type (BPF) benzoxazine, bisphenol S type (BPS) benzoxazine, diaminodiphenylmethane type (DDM) benzoxazine, oxydianiline type (ODA) benzoxazine and polybenzoxazine with polyimide. Preferably, the benzoxazine resin is ODA type benzoxazine resin, which lowers the Dk of cured products (1-10 GHz, the average is 4.0) and dielectric loss factor Df (1-10 GHz, the average is 0.0065), increases heat resistance, and lowers water absorption. Preferably, the halogen-free epoxy resin composition according to the present invention uses an ODA type benzoxazine resin. The ODA type benzoxazine has superior dielectric properties in addition to traditional advantages such as high glass transition temperatures (Tg), low water absorption, high dimension stability, low heat expansion coefficient, and high flame retardant property. The combination of benzoxazine resin with epoxy resin effectively lowers the dielectric constant property, dielectric loss property and water absorption of a cured product, while maintaining the viscosity of the resin mixture. Combining the benzoxazine resin with non-dopo type phosphorus-containing flame retardants also contributes to increase in flame retardant effect while reducing the contents of phosphorus in the cured product to satisfy UL 94V-0 flame retardant test, and further lowers the water absorption.

The active ester is selected from compounds comprising at least one highly reactive ester group, which participates in the curing reaction of epoxy resins. The curing reaction does not generate polar groups accordingly therefore provides a superior low dielectric constant, a low dielectric loss factor, high heat resistance and low water absorption. The curing system wherein the active ester is a curing agent for epoxy resins and reacts with epoxy resins to generate a net-like cross-linking structure without secondary hydroxyl alcohol groups, and provides a relatively low dielectric properties and low water absorption compare to conventional epoxy resin system which generates secondary hydroxyl alcohol groups with a net-like cross linking structure in a ring-opening reaction. According to Japanese Patent Laid-open 2002-012650, 2003-082063 and 2003-252958, when compared with using a conventional novolac resin, an active ester having benzene, naphthalene or biphenyl structure as an epoxy resin curing agent; lower dielectric constant and dielectric loss value of the cured product can be obtained.

The active ester used in the present invention may be active ester having at least one active ester group. Preferably, the active ester contains at least two active ester groups. The active ester is generated by carboxylic acid compounds reacting with hydroxyl compounds and/or thiol compounds. Preferably, the active ester is generated by carboxylic acid compounds reacting with at least one from the group consisting of phenol compounds and naphthol compounds. More preferably, the active ester is aromatic compounds generated by active ester reacting with carboxylic acid compounds and naphthol compounds. The aromatic compounds have phenolic hydroxyl groups and at least two active ester groups. The active ester may be straight chained or branched. When the active ester has at least two carboxylic acid compounds in the molecules and the molecules have at least two carboxylic acid compounds containing aliphatic chains, the compatibility between the active ester and epoxy resins is increased. When the active ester has aromatic rings, the heat resistance is increased.

The examples of the carboxylic acid compound constituting the active ester include: benzoic acid, acetic acid, succinic acid, maleic acid, itaconic acid, phthalic acid, isophthalic acid, terephthalic acid, pyromellitic acid and the like. Among which, the preferred examples are succinic acid, maleic acid, itaconic acid, phthalic acid, isophthalic acid, and terephthalic acid in terms of the heat resistance. More preferably, the carboxylic acid compound is isophthalic acid and terephthalic acid.

The examples of the hydroxy compound constituting the active ester may include: hydroquinone, resorcinol, bisphenol A, bisphenol F, bisphenol S, phenolphthalein, methylation of bisphenol A, methylation bisphenol F, bisphenol methylation S, phenol, o-cresol, m-cresol, p-cresol, catechol, α-naphthol, β-naphthol, 1,5-dihydroxynaphthalene, 1,6-dihydroxynaphthalene, 2,6-dihydroxynaphthalene, dihydroxy benzophenone, trihydroxy benzophenone, tetrahydroxy benzophenone, phloroglucinol, benzene triol, dicyclopentadienyl bisphenol, phenol novolac and the like. Among which, in terms of increasing the heat resistance of the active ester, the preferred examples are 1,5-dihydroxynaphthalene, 1,6-dihydroxynaphthalene, 2,6-dihydroxynaphthalene, dihydroxy benzophenone, trihydroxy benzophenone, tetrahydroxy benzophenone, dicyclopentadienyl bisphenol and phenol novolac. More preferably, the hydroxy compound is dicyclopentadienyl bisphenol and phenol novolac. Dicyclopentadiene (DCPD) has a rigid structure. Accordingly, DCPD is able to keep a low linear expansion coefficient and at the same time increase the heat resistance; and also offer the advantage that the substrate cannot be bent easily.

The active ester may further comprise amine structure to increase the compatibility among the active ester, epoxy resins and other curing agents. The amine structure may be obtained by reaction with the monomer having amine group. Preferably, the diamine monomer comprises p-phenylene diamine (PPDA), 4,4'-oxydianiline (4,4'-ODA), 3,4'-Oxydianiline (3,4'-ODA), 2,2-Bis(4-[4-aminophenoxy]phenyl)propane (BAPP), 2,2-Bis(4-[3-aminophenoxy]phenyl)sulfone (m-BAPS), 1,3-Bis(4-aminophenoxy)benzene (TPE-R) monomers and the like. More preferably, the diamine monomer is 4,4'-oxydianiline (4,4'-ODA) with the structure as the following formula.

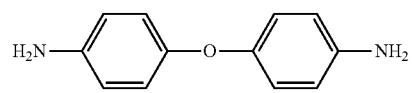

The active ester may be resins having more than one ester group or can be synthesized or modified from commercial products. For example, commercial products manufactured by DIC Corporation's "EXB-9460", "EXB-9460S", "EXB-9470", "EXB-9480", and "EXB-9420".

The manufacturing method of the active ester is not particularly limited. The active ester may be obtained by pre-synthesis method. For example, the active ester may be obtained by condensation reaction of carboxylic acid compounds and hydroxy compounds.

When an active ester is used as an curing agent of a epoxy resin, the active ester curing agent molecule has two or more ester group with relatively high activity to perform curing reaction with the epoxy resin. When the active ester reacts with the epoxy resin, a net-like structure without secondary alcohol hydroxyl group is generated yet polar groups are difficult to generate. The curing reaction does not generate polar groups and accordingly the cured epoxy resin provides a superiorly low dielectric constant, a low dielectric loss factor, high heat resistance and low water absorption.

An example of the active ester according to the invention is shown in the following formula 1:

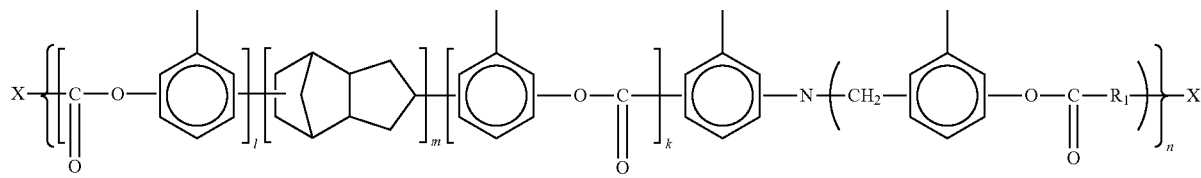

Formula One

X is benzene ring or naphthalene ring, 1, m, k=0 or 1, n=0.25-2. The dicyclopentadiene (DCPD)

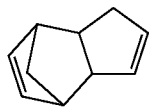

in Formula 1 may be substituted by naphthol, biphenol, bisphenol A, bisphenol F or bisphenol S structures. The functional group is used as the epoxy resin structure in a compound in order to enhance the compatibility of the compound.

The halogen-free epoxy resin composition of the invention uses active esters as curing agents which takes full advantages that no polar groups is generate by active esters reacting with epoxy resins and the product provides a superior dielectric property and desired heat resistance.

The resin compositions do not use maleic anhydride curing agent because the resin compositions generated by adding maleic anhydride are brittle (low strength) and have lower heat resistance. The active ester used in the present invention effectively improve the overall heat resistance of the resin compositions and offer superior low dielectric factor (Df).

The flame retardants used in the present invention such as non-dopo flame retardants are compound with phosphorus and/or vinyl group. A flame retardant is selected from one of the group consisting of flame retardants having the following structure formula with flame retardant property;

Formula One

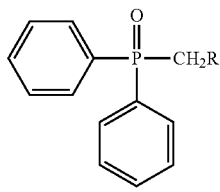

wherein R is selected from a group consisting of:

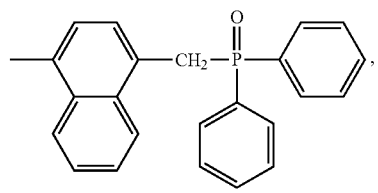

-continued

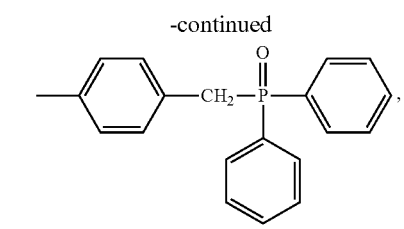

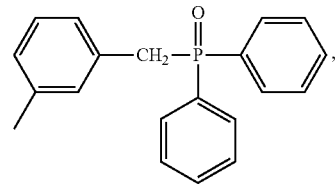

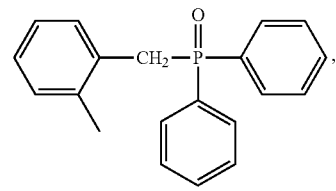

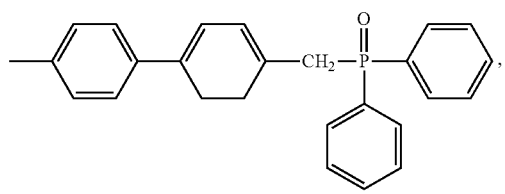

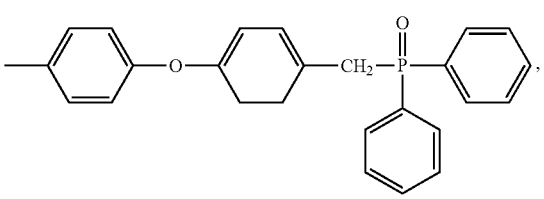

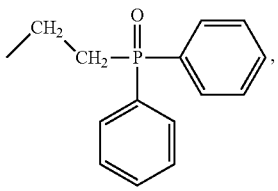

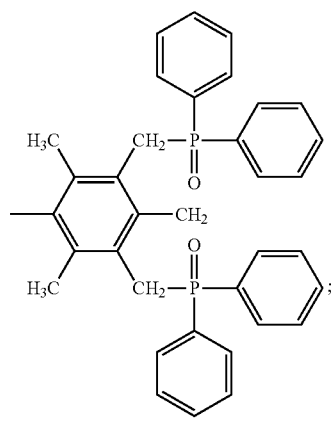
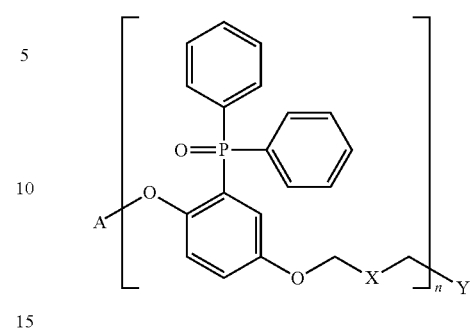
Formula Three
wherein X is selected from a group consisting of:
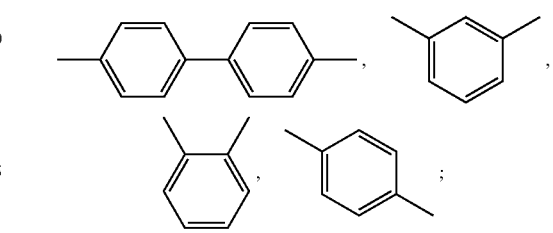
A is selected from a group consisting of:
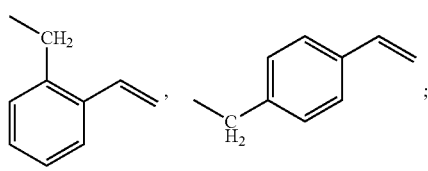
when n is 0, Y is:
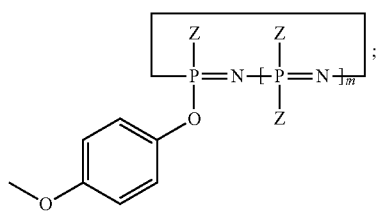
when is an integer between 0-500, Y selected from a group consisting of:
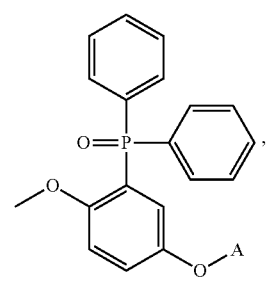
Formula Two
wherein X is selected from a group consisting of:
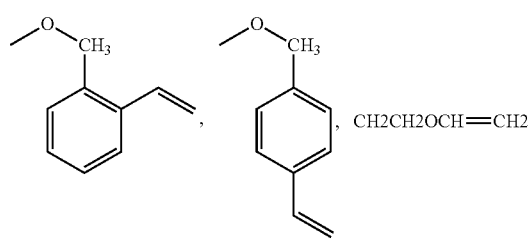
Y is selected from a group consisting of:
n is an integer between 0-500;

-continued

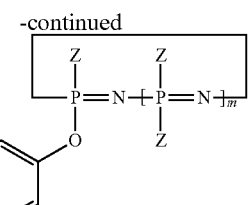

m ≧ ;

Z is selected from a group consisting of:

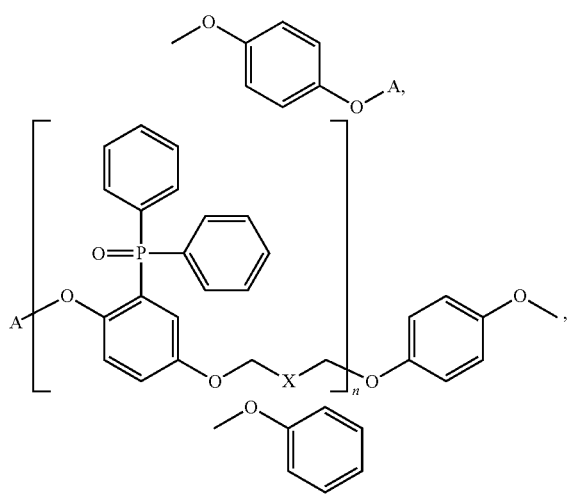

m ≧ 0.

The halogen-free epoxy resin composition uses DOPO modified curing agents. The disadvantage is the P—O—C bonding within the DOPO structure are easily hydrolyzed to generate P—OH which increases the material dielectric constant and low dielectric loss. Therefore, a non-dopo type flame retardant is used in order to avoid increasing material Dk/Df, and the above mentioned active ester curing agent is added in order to avoid increased water absorption.

In addition to Non-dopo type flame retardants, at least one of the following particular flame retardant compounds may be optionally added. Selected flame retardant compound may be a salt, such as a phosphate compound or a nitrogen-containing phosphate compound but are not limited thereto, for example selected from one or more of resorcinol dixylenylphosphate, RDXP (such as PX-200), melamine polyphosphate, (tri(2-carboxyethyl)phosphine (TCEP), trimethyl phosphate (TMP), tri (isopropyl chloride) phosphate, dimethyl methyl phosphonate (DMMP), bisphenol diphenyl phosphate, ammonium polyphosphate), hydroquinone bis-(diphenyl phosphate), bisphenol A bis-(diphenylphosphate).

The curing accelerator according to the present invention is selected from one or more of imidazole, boron trifluoride amine complexes, 2-ethyl-4-methylimidazole (2E4MI), 2-methylimidazole (2MI), 2-phenyl-1H-imidazole (2PZ), ethyltriphenyl phosphonium chloride, triphenylphosphine (TPP) and 4-dimethylaminopyridine (DMAP), terminal bromine-based liquid butadiene rubber (BTPB) with low molecular weight.

The halogen-free epoxy resin composition further comprises inorganic fillers so as to increase the thermal conductivity of the resin composition, improved thermal expansion and mechanical strength and other characteristics. The inorganic filler preferably is evenly distributed in the resin composition. The inorganic filler is processed via a surface treatment in advance. The inorganic fillers can be spherical, flaky, granular, columnar, plate-like, needle-like or irregular shape. The inorganic fillers comprise one more of silicon dioxide (molten state, non-molten state, porous or hollow type), aluminum oxide, aluminum oxide, magnesium oxide, calcium carbonate, aluminum nitride, boron nitride, silicon carbide, silicon carbide, titanium dioxide, zinc oxide, zirconium oxide, barium sulfate, magnesium carbonate, barium carbonate, mica Talc, and graphene.

In order to make any skilled person in the relevant art to understand the technical contents of the present invention and according to implement, and in accordance with this specification disclosed, the claim scope and drawings, and any skilled person in the relevant art may easily understand the objects and advantages relevant to the present invention, the detailed features and advantages of the present invention in embodiments will be described in detail in the following detailed description of the invention.

BRIEF DESCRIPTION OF DRAWING

N/A

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

In order to make the above mentioned and other objects, features and advantages become apparent from, embodiments are detailed in the following: The resin compositions illustrated in embodiments 1 to 5 (E1 to E5) are respectively listed in Table One, and the resin compositions illustrated in comparative embodiments 1 to 4 (C1 to C4) are respectively listed in Table Three.

The resin compositions illustrated in above mentioned embodiments 1 to 5 and the comparative embodiments 1 to 4 are uniformly mixed in stirring tank by batches then put in an impregnation tank. The glass fiber cloth is impregnated in the impregnation tank where the resin compositions are attached to the glass fiber fabric, and then the glass fiber fabric with resin compositions is heated and baked to a semi-cured state in order to obtain semi-cured films.

Take four semi-cured prepregs from the same batch prepared at the same time and two 18 μm copper foils, and laminate in an order of one copper foil, four semi-cured prepregs and one copper foil to obtain a metal clad laminate, and then pressed for two hours at 220° C. under vacuum. The four semi-cured prepregs are used as an insulating layer between two copper foils.

Respectively, properties of substrate containing copper foil and substrate without copper foil after etching were measured. The properties measured include glass transition temperature (Tg), copper foil substrate heat resistance (T288), pressure cooker test (PCT) for copper-free substrates after Dip test and moisture absorption, peeling between copper foil and substrates (peel strength, half ounce copper foil, P/S), dielectric constant (Dk, preferably Dk is lower), dielectric loss (Df, preferably Df is lower), flame retardant property (flaming test, UL94, wherein the ranking is V-0>V-1>V-2).

The property measurement results of the substrate made with the resin compositions in the embodiments 1 to 5 are listed in Table Two, and the property measurement results of the substrate made with the resin compositions in the comparative embodiments 1 to 4 are listed in Table Four. Compare the results of the embodiments 1 to 5 in Table Two and the comparative embodiments 1 to 4 in Table Four, the properties of the substrates with composition containing resin compositions and ratios disclosed in the present invention are superior than those made with the comparative embodiments 1 to 4. The embodiments 1 to 5 (E1 to E5) contains active ester, DOPO modified curing agent and benzoxazine resin. The result shows the dielectric loss (Df) decreases as the quantity of the active ester reduces. As shown in E1, substrates containing active ester and benzoxazine resins but without DOPO modified curing agents have high Tg; as shown in E5, substrates with active ester and DOPO modified curing agents but without benzoxazine resins have higher peel strength (P/S) and lower dielectric constant (Dk).

The comparative embodiments 1 to 4 (C1 to C4) uses styrene maleic anhydride (EF60) and benzoxazine resins. The result shows that the heat resistance decreases (Tg, T2288) as quantity styrene maleic anhydride (EF60) increases. According to the results indicated in the embodiments 1 to 5 and the comparative embodiments 1 to 4, the active ester used in the embodiments 1 to 5 according to the present invention effectively improves the overall heat resistance of the resin composition and provide superior low dielectric loss factor (Df).

TABLE ONE

| Composition | | E1 | E2 | E3 | E4 | E5 |
|---|---|---|---|---|---|---|
| Epoxy resin | HP-7200 | 40 | 40 | 40 | 30 | 30 |
| | NC-3000 | 60 | 60 | 60 | 70 | 70 |
| DOPO modified curing agent | DOPO-BPAN | — | 7 | 15 | 23 | 30 |
| Benzoxazine resin | LZ8280 | 10 | 8 | 5 | 2 | — |
| Active ester compound | Formula 1 active ester | 90 | 85 | 80 | 75 | 70 |
| Flame retardant | Formula 1 flame retardant | 40 | — | — | 30 | 5 |
| | Formula 2 flame retardant | — | 40 | — | 5 | 5 |
| | Formula 3 flame retardant | — | — | 40 | 5 | 30 |
| Flame retardant compound | PX-200 | 10 | 10 | 10 | 10 | 10 |
| Inorganic filler | Flaky silicon dioxide | — | 33 | — | 40 | — |
| | Granular silicon dioxide | 33 | — | 40 | — | 40 |
| Curing accelerator | BTPB | 8 | 8 | 8 | 5 | 5 |
| | 2E4MI | 2 | 2 | 2 | 5 | 5 |
| Solvent | MEK | 45 | 45 | 45 | 50 | 50 |
| | PMA | 20 | 20 | 20 | 30 | 30 |

TABLE TWO

| Properties test | Test method | E1 | E2 | E3 | E4 | E5 |
|---|---|---|---|---|---|---|
| Tg | DSC | 181 | 178 | 177 | 174 | 172 |
| T288 | TMA | >60 | >60 | >60 | >60 | >60 |
| PCT (dip minute) | 1 hr/120° C. | >60 | >60 | >60 | >60 | >60 |
| P/S (lb/min) | Hoz Cu foil | 7.8 | 7.7 | 7.9 | 7.8 | 8.1 |
| Dk | 1 GHz | 4.15 | 4.17 | 4.14 | 4.1 | 4.09 |
| Df | 1 GHz | 0.0068 | 0.0065 | 0.0064 | 0.0061 | 0.0059 |
| Flammability | UL94 | V-0 | V-0 | V-0 | V-0 | V-0 |
| Others | PP appearance | Good | Good | Good | Good | Good |

TABLE THREE

| Composition | | C1 | C2 | C3 | C4 |
|---|---|---|---|---|---|
| Epoxy resin | HP-7200 | 40 | 40 | 40 | 40 |
| | NC-3000 | 60 | 60 | 60 | 60 |
| Maleic anhydride curing agent | Styrene maleic anhydride (SMA), EF60 | 30 | 25 | 20 | 10 |
| Benzoxazine resin | LZ8280 | 45 | 50 | 50 | 55 |
| Flame retardant | Formula 1 flame retardant | 35 | — | — | 10 |
| | Formula 2 flame retardant | — | 35 | — | 10 |
| | Formula 3 flame retardant | — | — | 35 | 10 |
| Flame retardant compound | PX-200 | 10 | — | — | 5 |
| | TCEP | — | 10 | — | 5 |
| | TMP | — | — | 10 | 5 |
| Inorganic filler | Spherical silicon dioxide | 40 | 40 | 40 | 40 |
| Curing accelerator | 2E4MI | 1 | 1 | 1 | 1 |
| Solvent | MEK | 50 | 40 | 30 | 20 |
| | PMA | 20 | 30 | 40 | 50 |

TABLE FOUR

| Properties test | Test method | C1 | C2 | C3 | C4 |
|---|---|---|---|---|---|
| Tg | DSC | 158 | 163 | 163 | 166 |
| T288 | TMA | >30 | >30 | >50 | >60 |
| PCT (dip minute) | 1 hr/120° C. | >60 | >60 | >60 | >60 |
| P/S (lb/min) | Hoz Cu foil | 6.1 | 6.8 | 6.5 | 7.1 |
| Dk | 1 GHz | 4.04 | 4 | 3.99 | 3.93 |
| Df | 1 GHz | 0.0086 | 0.008 | 0.0081 | 0.0077 |
| Flammability | UL94 | V-0 | V-0 | V-0 | V-0 |
| Others | PP appearance | Good | Good | Good | Good |

The halogen-free resin composition of the present invention provides low dielectric constant, low dielectric loss, high heat resistance, and high flame retardant property by having particular composition and specific ratio; and is used for manufacturing semi-cured prepreg or resin coated film applied in copper clad substrates and printed circuit boards. In terms of industrial applicability, products developed using the resin composition of the present invention can effectively satisfy the demands in the current market.

The above-mentioned descriptions represent merely the preferred embodiment of the present invention, without any intention to limit the scope of the present invention thereto. Various equivalent changes, alternations, or modifications based on the claims of present invention are all consequently viewed as being embraced by the scope of the present invention.

What is claimed is:

1. A halogen-free epoxy resin composition having low dielectric loss, comprises:
   (A) 100 parts by weight of an epoxy resin;
   (B) 10-30 parts by weight of a DOPO curing agent;
   (C) 1-10 parts by weight of benzoxazine resin;
   (D) 60-90 parts by weight of an active ester;
   (E) 20-50 parts by weight of a flame retardant; and
   (F) 0.5-10 parts by weight of a curing accelerator,
   wherein the active ester contains at least two active ester groups;
   wherein the active ester has the following Formula A:

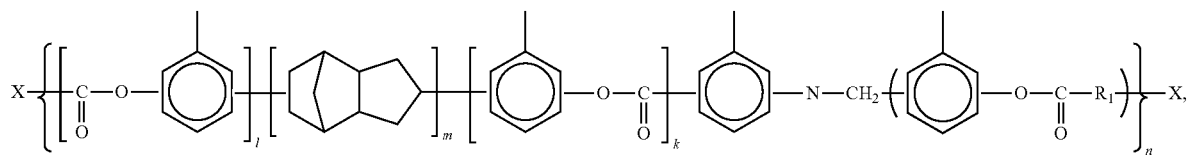

Formula A and
wherein the functional groups may be substituted by naphthol, biphenol, bisphenol A, bisphenol F or bisphenol S structures, X is benzene ring or naphthalene ring, 1, m, k=0 or 1, n=0.25-2.

2. The halogen-free epoxy resin composition having low dielectric loss of claim 1, wherein the epoxy resin is selected from one of the group consisting of bisphenol A epoxy resin, bisphenol F epoxy resin, bisphenol S epoxy resin, phenol novolac epoxy resin, cresol novolac epoxy resin, bisphenol A novolac epoxy resin, bisphenol F novolac epoxy resin, diphenylenthylene epoxy resin, epoxy resin having triazine skeleton, epoxy resin having fluorene skeleton, triphenylmethane epoxy resin, biphenyl epoxy resin, xylylene epoxy resin, biphenyl aralkyl epoxy resin, naphthalene epoxy resin, dicyclopentadiene epoxy resin, alicyclic epoxy resin, diglycidyl ether having polyfunctional phenols and fused ring aromatics, trifunctional and tetrafunctional epoxy resin with three or four in the molecule, and phosphorus-containing epoxy resin.

3. The halogen-free epoxy resin composition having low dielectric loss of claim 1, wherein the DOPO curing agent is selected from one material of the group consisting of 9,10-dihydro-9-oxa-10-phosphaphenanthrene-10-oxide (DOPO) and its derivatives.

4. The halogen-free epoxy resin composition having low dielectric loss of claim 1, wherein the benzoxazine resin is selected from one resin of the group consisting of bisphenol F (BPF) benzoxazine, bisphenol S (BPS) benzoxazine, diaminodiphenylmethane (DDM) benzoxazine, oxydianiline (ODA) benzoxazine and polybenzoxazine with polyimide.

5. The halogen-free epoxy resin composition having low dielectric loss of claim 1, wherein the flame retardant is selected from one flame retardant having the following structure formulas of the group consisting of:

Formula One wherein R is selected from a group consisting of:

-continued
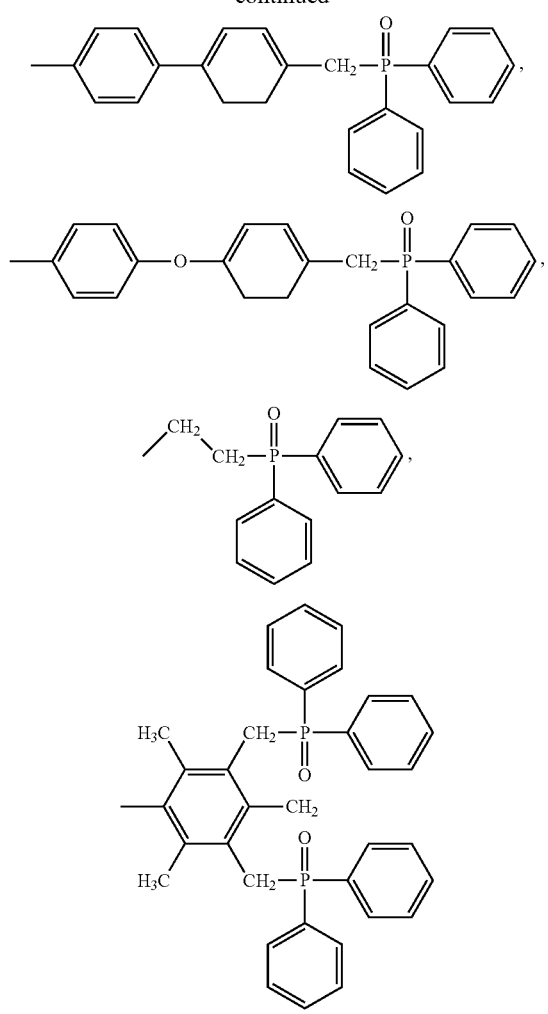
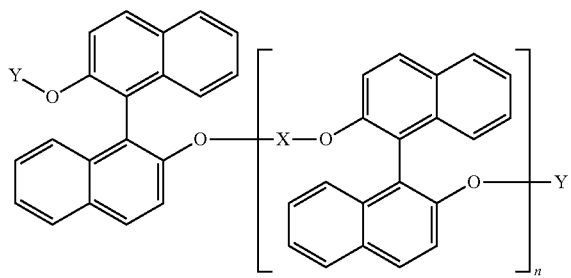
Formula Two
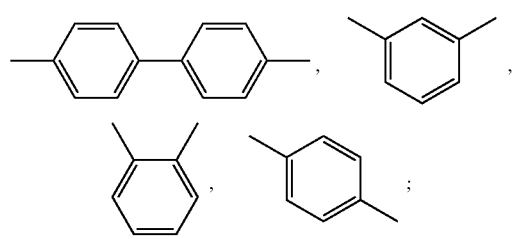
wherein X is selected from a group consisting of:
Y is selected from a group consisting of:
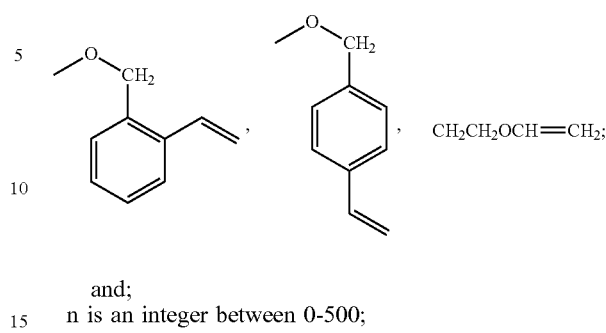, $CH_2CH_2OCH=CH_2$;
and;
n is an integer between 0-500;
Formula Three
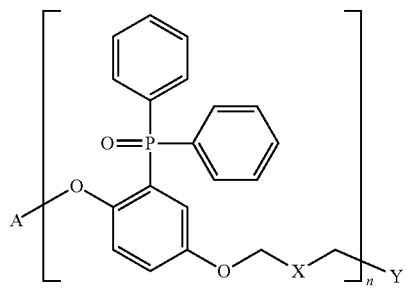
wherein X is selected from a group consisting of:
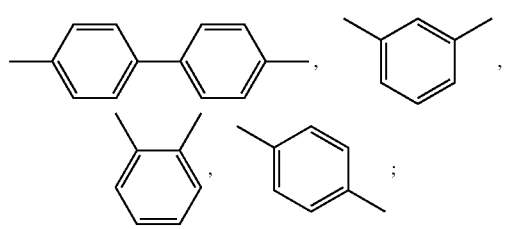
A is selected from a group consisting of:
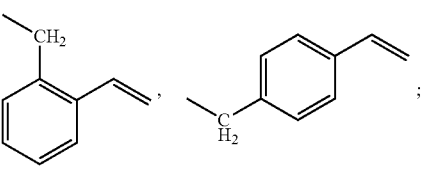
when n is 0, Y is:
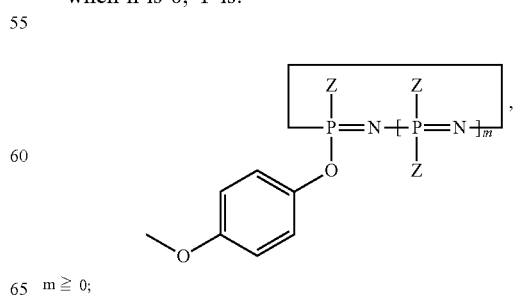
$m \geq 0$;

when n is an integer between 1-500, Y selected from a group consisting of:

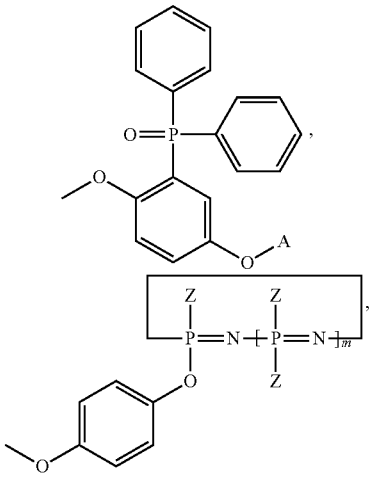

m ≥ 0;

A is selected from a group consisting of:

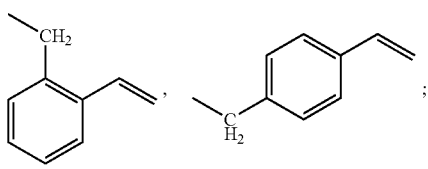

and

Z is selected from a group consisting of:

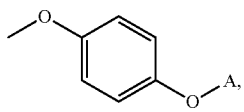

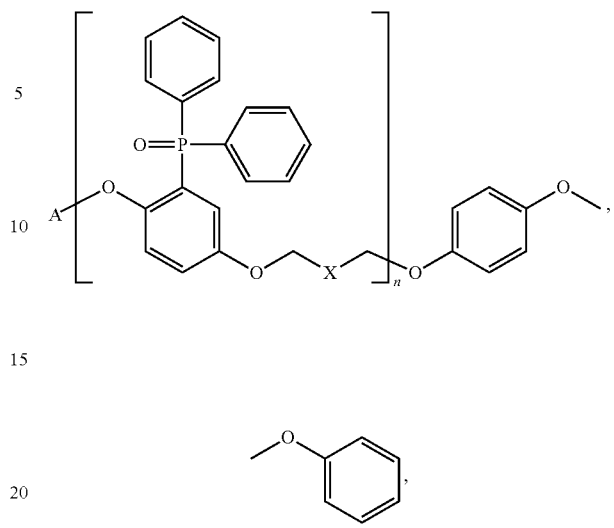

m ≥ 0.

6. The halogen-free epoxy resin composition having low dielectric loss of claim 1, further comprising an additional flame retardant compound selected from one of a group consisting of resorcinol dixylenylphosphate, melamine polyphosphate, (tri (2-carboxyethyl) phosphine (TCEP), trimethyl phosphate (TMP), tri (isopropyl chloride) phosphate, dimethyl methyl phosphonate (DMMP), bisphenol diphenyl phosphate, ammonium polyphosphate), hydroquinone bis-(diphenyl phosphate), and bisphenol A bis-(diphenylphosphate).

7. The halogen-free epoxy resin composition having low dielectric loss of claim 1, wherein the curing accelerator is selected from one of the group consisting of imidazoles, boron trifluoride amine complexes, 2-ethyl-4-methylimidazole, 2-methylimidazole, 2-phenyl-1H-imidazole, ethyltriphenyl phosphonium chloride, triphenylphosphine, and 4-dimethylaminopyridine.

* * * * *